(12) United States Patent
Regan et al.

(10) Patent No.: US 6,816,305 B2
(45) Date of Patent: Nov. 9, 2004

(54) PRE-ASSEMBLED PIVOTING LENS UNIT

(75) Inventors: Rick R. Regan, Aloha, OR (US); John A. Karge, Aloha, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 0 days.

(21) Appl. No.: 10/282,740

(22) Filed: Oct. 28, 2002

(65) Prior Publication Data

US 2004/0080819 A1 Apr. 29, 2004

(51) Int. Cl.[7] .............................................. G02B 23/00
(52) U.S. Cl. ........................ 359/429; 359/399; 359/425
(58) Field of Search ........................ 359/399, 420–429, 359/432, 694–706, 808, 819; 42/101–124

(56) References Cited

U.S. PATENT DOCUMENTS

| | | | |
|---|---|---|---|
| 3,058,391 A | * 10/1962 | Leupold | 359/422 |
| 3,161,716 A | * 12/1964 | Burris et al. | 356/247 |
| 3,297,389 A | 1/1967 | Gibson | 359/424 |
| 4,408,842 A | 10/1983 | Gibson | 359/422 |
| 4,998,811 A | * 3/1991 | Basta | 359/422 |
| 5,463,495 A | * 10/1995 | Murg | 359/429 |
| 5,615,487 A | * 4/1997 | Tomita | 42/122 |
| 6,005,711 A | * 12/1999 | Mai et al. | 359/424 |
| 6,469,829 B2 | * 10/2002 | Otteman | 359/429 |

* cited by examiner

Primary Examiner—Thong Q Nguyen
(74) Attorney, Agent, or Firm—Stoel Rives LLP

(57) ABSTRACT

A pre-assembled pivoting lens unit is disclosed that includes a pivot cartridge capable of being at least partially received by an optical sighting device housing, along with a pivot tube defining a first end movably coupled to the pivot cartridge and a second end capable of moving transversely to the longitudinal axis of the device housing. Disposed in the pivot tube between the first and second ends is a lens assembly capable of focusing an image when the lens unit is at least partially received by the device housing. A fastener is used to secure the pivot cartridge to the first end of the pivot tube, and a resilient member interposes the fastener and pivot tube first end to enable relative pivoting movement of the pivot tube.

27 Claims, 4 Drawing Sheets

PRE-ASSEMBLED PIVOTING LENS UNIT

TECHNICAL FIELD

This application relates to devices for pivotally mounting lenses within the housing of an optical sighting device such as a riflescope and, in particular, to a pivoting lens unit that is pre-assembled prior to installing within the housing of the optical sighting device.

BACKGROUND OF THE INVENTION

Optical sighting devices have long been used in conjunction with weapons, such as rifles and handguns, to allow a user to accurately aim the weapon. Optical sighting devices such as riflescopes typically include eyepiece and objective lenses positioned at opposite ends of a tubular housing. A lens assembly is positioned medially of the eyepiece and objective lenses, and may be movable along a longitudinal axis of the housing for adjustment of the optical power of the optical sighting device. An aiming reticle is positioned in the optical path of the optical sighting device, typically between the lens assembly and the eyepiece lens. Because bullet trajectory, wind conditions and distance to the target can vary depending upon shooting conditions, quality riflescopes typically provide compensation for variations in these parameters by allowing a user to make small adjustments to the optical characteristics or the aiming of the weapon relative to the rifle or handgun on which it is mounted. These adjustments are known as windage and holdover adjustments and are typically accomplished by pivotal movement of the lens assembly within the housing of the optical sighting device to divert the optical path of the observed light before it reaches the reticle, as shown in U.S. Pat. Nos. 3,297,389 and 4,408,842 to Gibson, which are incorporated herein by reference.

To aid in pivotal movement of the lens assembly, the optical sighting device industry has developed a pivoting lens unit and lens assembly, which includes a pivot cartridge mounted to the housing of the device, a pivot tube disposed within the housing and supporting the lens assembly, and a resilient member that biases the pivot cartridge toward the pivot tube while allowing pivotal movement of the pivot tube and lens assembly. In these designs, the pivoting lens unit is generally positioned proximate the eyepiece of the housing. However, it is also known to position the pivoting lens unit proximate the objective end of the housing. A pivot end of the pivot tube that extends along the longitudinal axis of the housing is pivotally mounted to the interior of the housing near the eyepiece end of the housing. The lens assembly is supported near a free end of the pivot tube opposite the pivot end. Adjustment of windage and holdover is accomplished by turning an adjustment mechanism that operatively engages a leaf spring, thereby driving the free end of the pivot tube, including the lens assembly, transversely of the housing longitudinal axis and thereby altering the optical path between the eyepiece and objective lenses.

However, current manufacturing and assembly processes require the pivoting lens unit to be manufactured and assembled with the housing. These processes are time-consuming and expensive because each component of the pivoting lens unit is manufactured and then separately assembled with the housing. The pivoting lens unit is provided on an "as-needed basis" and is typically manufactured and assembled by the same manufacturer at the same time the optical sighting device is built, thereby reducing flexibility in the manufacturing and assembly processes. In addition, the assembly process is complicated by the number of loose components that an installer must assemble in a particularized order. The process involves great efforts and requires substantial skill because the fit between components requires precise dimensional coordination, which is of substantial significance for the accurate operation of the optical sighting device. Imprecision of one component leads to re-manufacture and re-assembly of that component and possibly re-assembly of other components that followed in the assembly process.

The assembly process is further slowed and complicated by the requirement to use a special tool to assemble some components of the pivoting lens unit. The pivot tube is installed in the housing following installation of the leaf spring; however, to install the pivot tube, the installer must use a special hand tool to compress the leaf spring, which in final assembly is disposed between the housing and the pivot tube.

Thus, there exists a need to simplify the manufacturing and assembly processes associated with optical sighting devices, and the pivoting lens unit in particular, to reduce the costs of manufacturing and assembling a pivoting lens unit while maintaining or even improving the precision of optical sighting devices.

SUMMARY OF THE INVENTION

The present invention is directed in part to a pre-assembled pivoting lens unit that facilitates the manufacturing and assembly processes for an optical sighting device. Therefore, consistent with one aspect of the invention, a pre-assembled pivoting lens unit is disclosed that includes a pivot cartridge capable sized to be at least partially received by an optical sighting device housing, along with a pivot tube defining a first end movably coupled to the pivot cartridge and a second end extending from the pivot cartridge and capable of moving transversely to the longitudinal axis of the device housing. Disposed in the pivot tube between the first and second ends is a lens assembly capable of focusing an image when the lens unit is at least partially received by the device housing. A fastener such as a nut is used to pivotally secure the pivot cartridge to the first end of the pivot tube, and a resilient member such as a spring interposes the fastener and pivot tube first end to enable relative pivoting movement of the pivot tube.

Consistent with another aspect of the invention, the above-described lens assembly may be positionally fixed between the first and second ends of the pivot tube to provide an optical sighting device with fixed magnification. Alternatively, the lens assembly may include a cam sleeve supported around at least a portion of the pivot tube and communicating with the lens assembly to drive the lens assembly along the longitudinal axis, thereby selectively adjusting the optical magnification provided by the optical sighting device.

In another embodiment of the invention, the above-described lens assembly may include a key formed in the pivot cartridge that engages a keyway formed in the first end of the pivot tube, thereby restricting rotation of the pivot tube relative to the pivot cartridge and cam sleeve. Alternatively, the lens assembly may include a key formed in the housing that engages a keyway formed in the pivot cartridge for orienting and rotationally fixing the pivot tube about the housing longitudinal axis. Fixing the position of the pivot tube facilitates use of the cam sleeve for adjusting optical magnification.

Other aspects and embodiments of the present invention include an optical sighting device incorporating such a pre-assembled pivoting lens unit, as well as a method for manufacturing the same.

Pre-assembly of the pivoting lens unit in accordance with these aspects and features results in a cost-effective technique for producing the optical sighting device, since rather than tracking a series of components, the manufacturer need only track one component—the pre-assembled pivoting lens unit. Moreover, consistent with an embodiment of the present invention, the entire pivoting lens unit can be pre-assembled at an off-site pre-assembly facility and shipped to the optical sighting device manufacturer as a single unit. Once the pivoting lens unit is pre-assembled, it can be pre-tested off-site or by the optical sighting device manufacturer before installing in the optical sighting device. Pre-assembly of the pivoting lens unit increases the availability of such units, for the unit can be manufactured, assembled, and tested separately from the optical sighting device and stored as an off-the-shelf item.

Further still, pre-assembling the pivoting lens unit in accordance with the disclosed embodiments of the invention simplifies the final assembly process and eliminates the need for special assembly tools to install the pre-assembled pivoting lens unit within the optical sighting device. In addition, the pre-assembled pivoting lens unit can be easily removed to expose components mounted within the optical sighting device for service or replacement as needed.

Additional aspects and advantages of this invention will be apparent from the following detailed description of particular embodiments thereof, which proceeds with reference to the accompanying drawings.

DETAILED DESCRIPTION OF THE EMBODIMENTS

Figure 1:
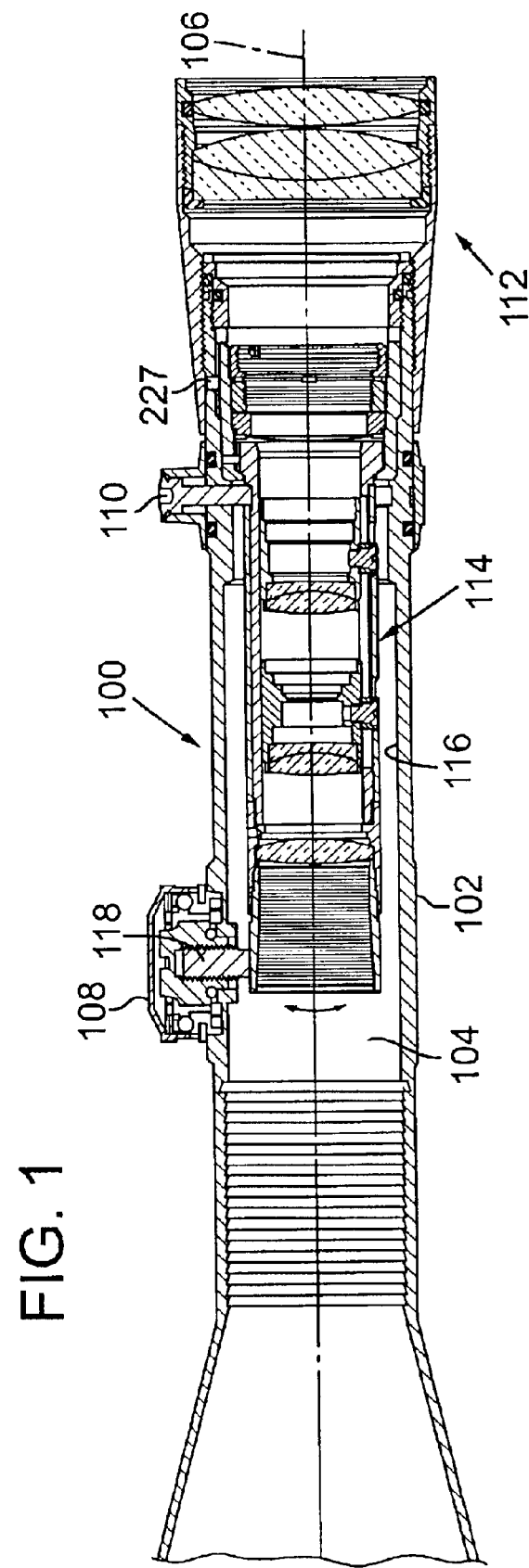
FIG. 1 is a cross-sectional view of an optical sighting device including a pre-assembled pivoting lens unit in accordance with an embodiment of the present invention.

The following description relates to an example of an optical sighting device incorporating features and aspects of the present invention, specifically a riflescope, and references the attached drawings. A riflescope is usually mountable to a firearm, a rifle or a handgun. FIG. 1 is a cross-sectional view of a riflescope 100 that has an outer tubular housing 102 having a bore 104 that extends along a longitudinal axis 106 of the housing 102. An adjustment mechanism 108 is located proximate the midpoint of the riflescope 100, and a power magnification selector ring 110 is located proximal of an eyepiece end 112. A pre-assembled pivoting lens unit 114 in accordance with an embodiment of the invention is disposed within the bore 104 and movably mounted to an interior wall 116 of the housing 102.

Figure 2:
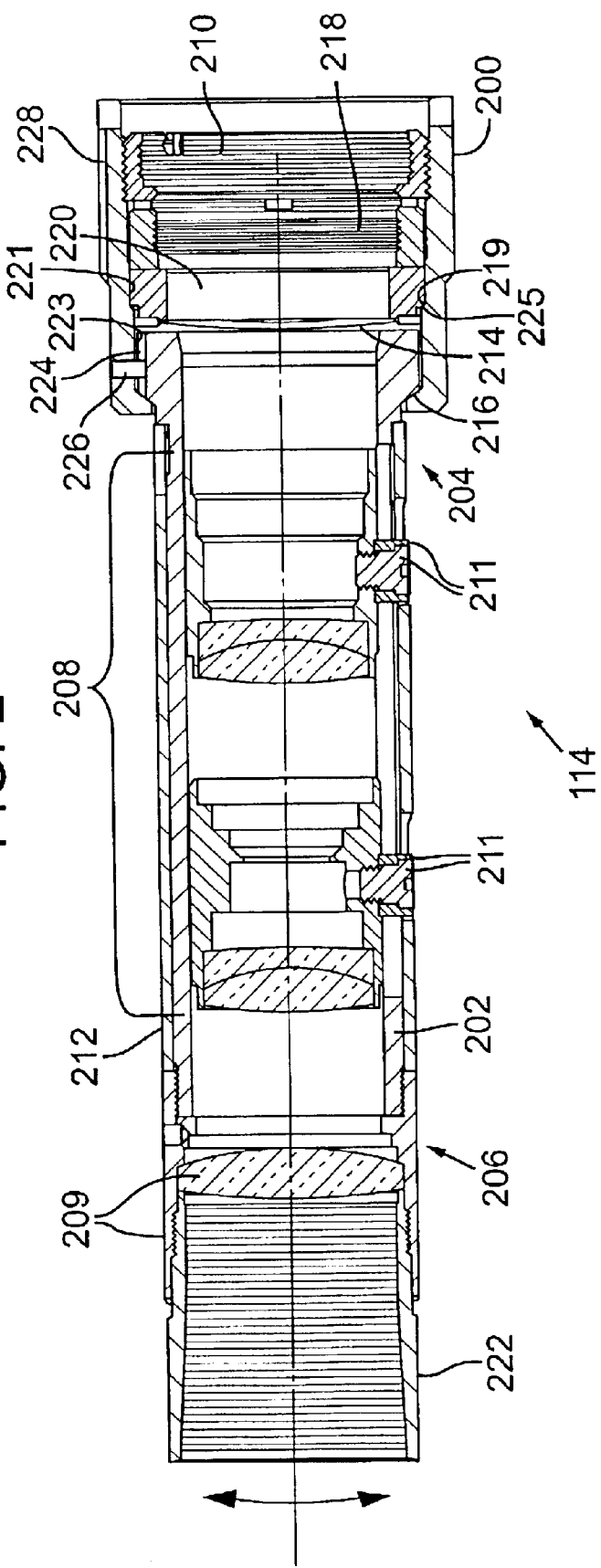
FIG. 2 is an enlarged cross-sectional view of the pre-assembled pivoting lens unit shown in FIG. 1.
Figure 3:
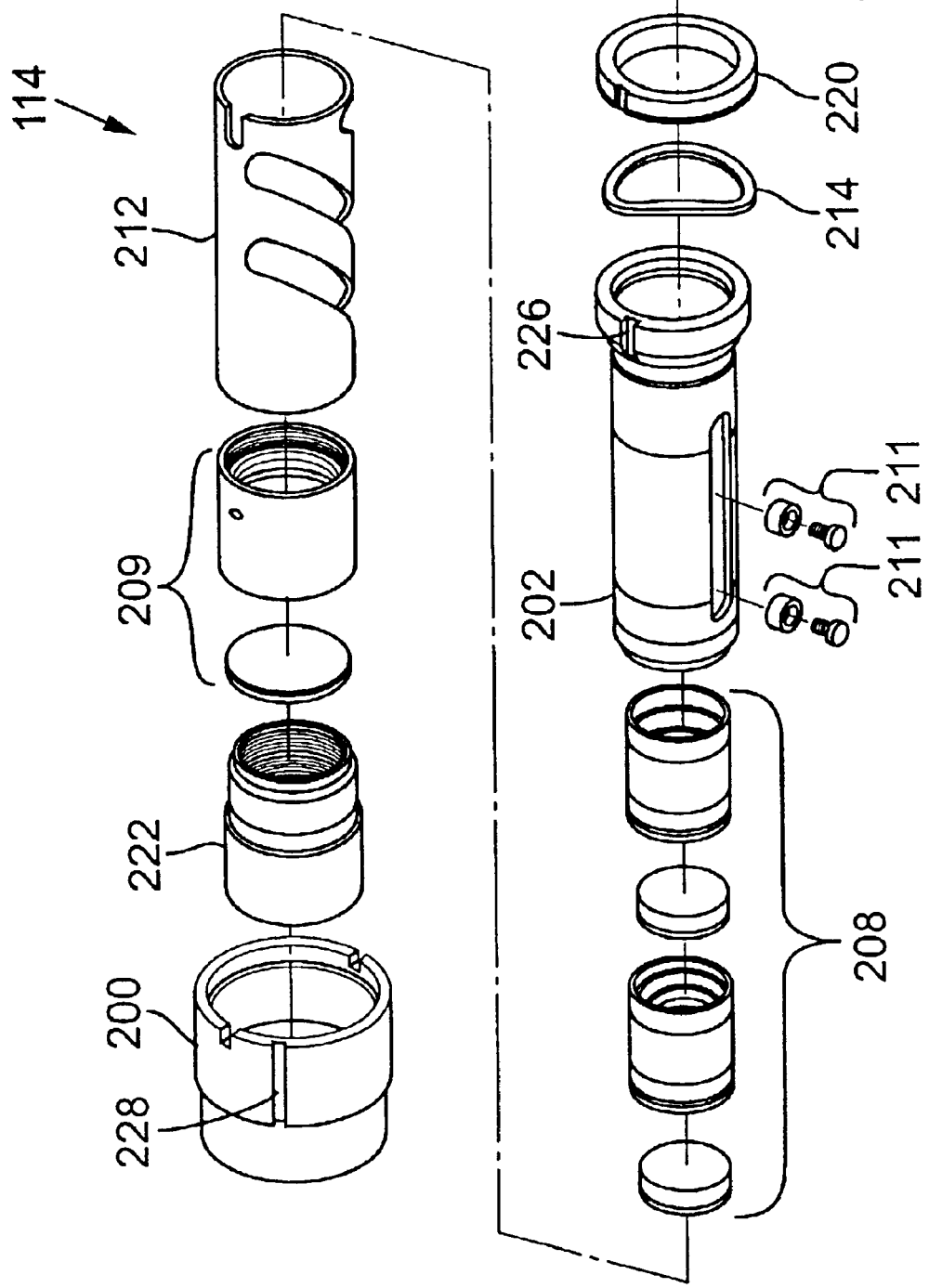
FIG. 3 is an exploded perspective view of the pre-assembled pivoting lens unit shown in FIG. 2.

FIG. 2 shows an enlarged cross-sectional view of the pre-assembled pivoting lens unit 114 of FIG. 1. FIG. 3 is an exploded view of the pre-assembled pivoting lens unit 114 of FIG. 2, showing the various elements that comprise the pre-assembled pivoting lens unit 114 and their order of assembly. With reference to both FIG. 2 and FIG. 3, the pre-assembled pivoting lens unit 114 includes a pivot tube 202 with a pivot end 204 sized for a sliding fit against a pivot cartridge 200. The pivot tube 202 extends longitudinally from the pivot end 204 and terminates in a free end 206. A lens assembly 208, preferably including two separately locatable doublet lens assemblies as shown in the embodiments of FIG. 2 and FIG. 3, is slidably disposed between the pivot end 204 and the free end 206 of the pivot tube 202. A field lens assembly 209, used, for example, for correcting field distortion in an image or magnifying an image, is mounted to the free end 206 of the pivot tube 202. A lens unit extender 222 is threadably coupled to the free end 206 of the pivot tube 202 for engagement by adjustment mechanism 108 to pivotably adjust the pivot tube 202 within the pivot cartridge 200, as further described below. A fastener 210 such as a nut is externally threaded to mate with interior threads in the pivot cartridge 200, thereby pivotally securing the pivot tube 202 to the pivot cartridge 200.

In the embodiment shown in FIG. 2, the lens assembly 208 is slidably mounted within the pivot tube 202, thereby providing a variable power feature. A set of cam followers 211 is mounted to the lens assembly 208. A cam sleeve 212 circumscribes the pivot tube 202 and drives the cam followers 211 for movement along the pivot tube 202, generally along the longitudinal axis 106 of the housing 102 when the pre-assembled pivoting lens unit 114 is installed, in response to manual rotation of the power magnification selector ring 110 rotatably mounted around the housing 102 and mechanically coupled to the cam sleeve 212. Those ordinarily skilled in the art will appreciate that the pre-assembled pivoting lens unit 114 could also be assembled with the cam sleeve 212 omitted and the lens assembly 208 rigidly secured to the pivot tube 202 (not shown), so that the optical power of the riflescope 100 is fixed.

As shown in FIG. 2, a resilient member 214, such as a wave spring, a set of coil springs or any other resilient material, biases the pivot cartridge 200 toward the pivot end 204 of the pivot tube 202 to enable relative pivoting movement of the pivot tube 202. The fastener 210, as previously discussed, is externally threaded to mate with interior threads in the pivot cartridge 200, thereby compressing the resilient member 214 so that the desired amount of force is applied against the pivot end 204 of the pivot tube 202, as well as securing the pivot tube 202 to the pivot cartridge 200. A step washer 220 is installed for transitioning from a larger inner diameter 221 to a smaller inner diameter 223 of the pivot cartridge 200, so that a ridge 225 of the step washer 220 seats against an inner shoulder 219 of the pivot cartridge 200. This prevents threading the fastener 210 into the pivot shoulder 219 to the extent of complete compression of the resilient member 214.

In FIG. 2, a wire reticle 218 is disposed between the fastener 210 and the step washer 220 in a focal plane of the riflescope 100 generally perpendicular to the longitudinal axis 106 of the housing 102 so that cross-hairs (not shown) of the reticle 218 are centered at a pivot point (not shown) when the pre-assembled pivoting lens unit 114 is installed. The pivot point is determined by the curvature of a socket joint 216, which, in FIG. 2, is where the pivot tube 202 slides against the pivot cartridge 200. The size of the pivot cartridge 200, the pivot tube 202 and the bore 104 in the housing 102 is such that the pivot point will coincide with the focal plane of the riflescope 100 when the pre-assembled pivoting lens unit 114 is installed in the housing 102. Those skilled in the art will appreciate that the socket joint 216 may include a conical or spherical socket surface against which the pivot tube 202 is seated, either in a full-socket or half-socket configuration. The socket joint 216 may also include an equalized pivot mount of the type described in U.S. Pat. No. 6,469,829, the specification of which is incorporated herein by reference.

As further shown in FIG. 2, a pivot tube keyway slot 224 extends longitudinally along the pivot end 204 of the pivot tube 202 and mates with a pivot cartridge key 226 extending transversely into the interior of the pivot cartridge 200 to limit rotation of the pivot tube 202 about its longitudinal axis relative to the pivot cartridge 200 and cam sleeve 212 (some play is necessary to accommodate the motion of the windage and holdover adjustments described below). The key 226 is preferably a pin that is press-fit into a small transverse hole through pivot cartridge 200. In alternative embodiments, the keyway slot may be formed in the pivot cartridge 200 and the key formed on the pivot tube 202.

Figure 4:
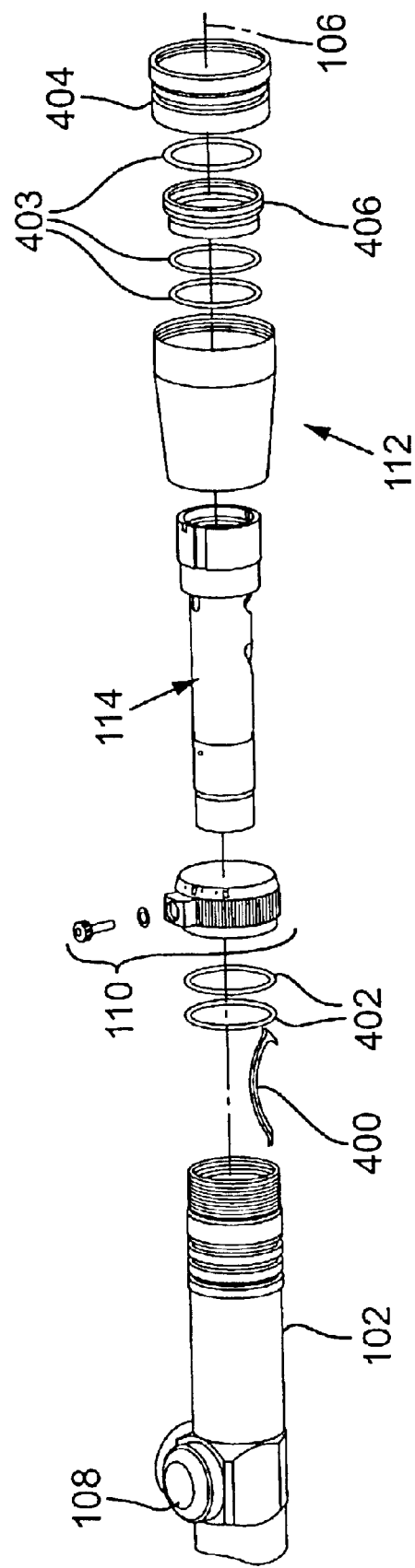
FIG. 4 illustrates assembly of an optical sighting device, including the pre-assembled pivoting lens unit, in accordance with an embodiment of the present invention.

FIG. 4 is a perspective view of an order of assembly for elements as they relate to an optical sighting device, such as, for example, the riflescope 100 that may be found mounted to a firearm, a rifle or a handgun (not shown), consistent with an embodiment of the invention. In the prior art, it has been necessary to manufacture and separately assemble each element shown in FIG. 3, in addition to the elements shown in FIG. 4, with the housing 102 of the riflescope 100. Pre-assembly of the pivoting lens unit 114, however, significantly reduces the amount of assembly required. To visually understand the magnitude of reduction, replace the pre-assembled pivoting lens unit 114 shown in FIG. 4 with the exploded view of the pre-assembled pivoting lens unit 114 shown in FIG. 3.

In the embodiment shown in FIG. 4, installation of the pre-assembled pivoting lens unit 114 is preceded by a series of O-rings 402, which are installed with the power magnification selector ring 110, which is rotatably mounted around the outside of the housing 102. Before installing the pre-assembled pivoting lens unit 114 in the bore 104 of the housing 102, a leaf spring 400 is mounted within the housing 102 adjacent where the free end 206 of the pivot tube 202 will be located. The leaf spring 400 biases the free end 206 toward the adjustment mechanism 108. With reference to FIG. 1 the adjustment mechanism 108 extends from the housing 102 and includes a plunger 118 that operatively engages the free end 206 of the pivot tube 202 when the pre-assembled pivoting lens unit 114 is installed. The adjustment mechanism 108 adjustably extends into the bore 104 and is manually adjustable to drive the pivot tube 202 for movement transversely of the longitudinal axis 106 in a vertical direction to adjust an elevation setting of the riflescope 100. Ordinarily skilled persons will appreciate that a second adjustment mechanism (not shown) could also be applied to adjust the horizontal position of the pivot tube 202 in a direction perpendicular to the adjustment mechanism 108, to thereby allow adjustment of windage in addition to elevation.

Returning to FIG. 4, after the leaf spring 400 is attached, the pre-assembled pivoting lens unit 114 is then installed in the bore 104 of the housing 102 such that the pivot cartridge 200 is rigidly secured, bonded, or press-fit to the interior wall 116 of the housing 102. Recall that in the prior art, the leaf spring 400 is installed in the bore 104 of the housing 102 using special assembly tools prior to installing the pivoting lens unit 114. Attaching the leaf spring 400 to the free end 206 of the pivot tube 202 before installing the pre-assembled pivoting lens unit 114 can eliminate the need for such special assembly tools.

A second key 227 (FIG. 1) extends inwardly within the interior of the housing 102 and mates with a second keyway slot 228 extending longitudinally along the outer surface of pivot cartridge 200 to orient the pivot tube 202 in a generally fixed rotational position about the longitudinal axis 106 of the housing 102 when the pre-assembled pivoting lens unit 114 is installed in the bore 104 of the housing 102. Fixing the rotational position of the pivot tube 202 about the longitudinal axis 106 of the housing 102 facilitates use of the cam sleeve 212 to move lens assembly 208 longitudinally by preventing rotation of the pivot cartridge 200 and the pivot tube 202 relative to the housing 102 in response to rotation of the cam sleeve 212 about the longitudinal axis 106. In alternative embodiments (not shown), the second key 227 may be formed in the pivot cartridge 200 and the second keyway slot 228 may be formed in the housing 102 to perform a similar function.

Returning to FIG. 4, a second series of O-rings 403 is installed immediately following installation of the pre-assembled pivoting lens unit 114 to form a gas tight seal at eyepiece end 112. A retainer, such as lock ring 406, is externally threaded to mate with the interior threads in the housing 102, thereby retaining the pre-assembled pivoting lens unit 114 and the reticle 218 within the housing 102. An eyepiece 404 is threaded onto the end of the housing 102 and environmentally sealed by the second O-rings 403 to protect the pre-assembled pivoting lens unit 114 from dust and debris.

It will be obvious to those having skill in the art that many changes may be made to the details of the above-described embodiments of this invention without departing from the underlying principles thereof. For example, in other embodiments, different mechanical fittings may be used to achieve the same effect. The scope of the present invention should, therefore, be determined only by the following claims.

What is claimed is:

1. A pre-assembled pivoting lens unit for installation into a tubular housing of an optical sighting device, the housing having a longitudinal axis, the lens unit comprising:

a pivot cartridge sized to be at least partially received within the housing;

a pivot tube having a longitudinal axis, the pivot tube comprising:
 a first end pivotably coupled to the pivot cartridge,
 a second end extending from the pivot cartridge and movable transversely to the longitudinal axis of the housing, and
 a lens assembly disposed within the pivot tube between the first and second ends; and a fastener pivotally securing the pivot tube to the pivot cartridge, the first end of the pivot tube being keyed to the pivot cartridge independent of the housing to thereby limit rotation of the pivot tube about its longitudinal axis relative to the pivot cartridge after pre-assembly of the pivoting lens unit and before installation of the pre-assembled pivoting lens unit in the housing.

2. The lens unit of claim 1 further comprising a resilient member interposing the first end of the pivot tube and the fastener, and in which the pivot cartridge at least substantially circumscribes and receives the first end of the pivot tube.

3. The lens unit of claim 2 wherein the resilient member comprises a wave spring.

4. The lens unit of claim 2 further comprising a reticle assembly disposed in proximate relationship to the resilient member.

5. The lens unit of claim 1 wherein the lens assembly is movable along the longitudinal axis of the housing.

6. The lens unit of claim 1, further comprising a cam sleeve operably engaging the lens assembly.

7. The lens unit of claim 1 wherein said fastener comprises a nut.

8. An optical sighting device, comprising:
a tubular housing having a longitudinal axis; and
a pre-assembled pivoting lens unit at least partially received within the housing, the lens unit comprising:
a pivot cartridge coupled to the housing;
a pivot tube having a longitudinal axis, the pivot tube comprising:
a first end pivotably coupled to the pivot cartridge,
a second end extending from the pivot cartridge and movable transversely to the longitudinal axis of the housing, and
a lens assembly disposed within the pivot tube between the first and second ends, the first end of the pivot tube being keyed to the pivot cartridge independent of the housing to thereby limit rotation of the pivot tube about its ion longitudinal axis relative to the pivot cartridge after pre-assembly of the pivoting lens unit and before installation of the pre-assembled pivoting lens unit in the housing; and
a fastener pivotally securing the pivot tube to the pivot cartridge.

9. The optical sighting device of claim 8 further comprising a resilient member interposing the first end of the pivot tube and the fastener, and in which the pivot cartridge at least substantially circumscribes and secures the first end of the pivot tube.

10. The optical sighting device of claim 9 wherein the resilient member comprises a wave spring.

11. The optical sighting device of claim 9 further comprising a reticle assembly disposed in proximate relationship to the resilient member.

12. The optical sighting device of claim 8 wherein the lens assembly is movable along the longitudinal axis of the housing.

13. The optical sighting device of claim 8, further comprising a cam sleeve operably engaging the lens assembly.

14. The optical sighting device of claim 8, further comprising a retainer coupled to the housing securing the lens unit within the housing.

15. The optical sighting device of claim 8 wherein the optical sighting device comprises a riflescope.

16. A pre-assembled pivoting lens unit for an optical sighting device, the optical sighting device defining a tubular housing having a longitudinal axis, the lens unit comprising:
a pivot cartridge sized to be at least partially received within the housing;
a pivot tube, comprising:
a first end pivotably coupled to the pivot cartridge,
a second end extending from the pivot cartridge and movable transversely to the longitudinal axis of the housing, and
a lens assembly disposed within the pivot tube between the first and second ends, the first end of the pivot tube being keyed to the pivot cartridge independent of the housing;
a fastener pivotally securing the pivot tube to the pivot cartridge; and
a resilient member interposing the first end of the pivot tube and the fastener for biasing the pivot cartridge toward the pivot tube, and in which the pivot cartridge at least substantially circumscribes and receives the first end of the pivot tube for orienting the pivot tube along the longitudinal axis of the housing.

17. The lens unit of claim 16 wherein the fastener comprises a nut.

18. The lens unit of claim 16 wherein the resilient member comprises a wave spring.

19. The lens unit of claim 16, further comprising a reticle assembly disposed in proximate relationship to the resilient member.

20. The lens unit of claim 16, further comprising a stop mechanism disposed between the resilient member and the fastener for preventing complete compression of the resilient member by the fastener.

21. The lens unit of claim 16 wherein the lens assembly is movable within the pivot tube along the longitudinal axis of the housing.

22. The lens unit of claim 21, further comprising:
a set of cam followers fixedly mounted to the lens assembly; and
a cam sleeve supported around at least a portion of the pivot tube for rotation about the longitudinal axis, the cam sleeve driving the cam followers for movement along the longitudinal axis to thereby adjust a magnification setting of the optical sighting device.

23. The lens unit of claim 16 wherein the lens assembly is rigidly fixed along the longitudinal axis of the housing between the first and second ends.

24. The lens unit of claim 16, further comprising:
a first keyway formed in one of the pivot cartridge and the housing; and
a first key formed in the other of the pivot cartridge and the housing, the first key engaged in the first keyway to limit rotation of the pivot cartridge about the longitudinal axis of the housing.

25. The lens unit of claim 16, further comprising:
a second keyway formed in one of the pivot cartridge and the pivot tube; and
a second key formed in the other of the pivot cartridge and the pivot tube, the second key engaged in the second keyway to limit rotation of the pivot tube about the longitudinal axis of the housing.

26. A method for manufacturing an optical sighting device, comprising:
(a) providing a tubular housing, the housing having a longitudinal axis;
(b) pre-assembling a pivoting lens unit, the lens unit including:
(i) a pivot cartridge sized to be at least partially received by the housing,
(ii) a pivot tube, the pivot tube including a first end movably coupled to the pivot cartridge and a second end extending from the pivot cartridge, the second end being rotatable transversely of the longitudinal axis of the housing, and
(iii) a lens assembly disposed within the pivot tube between the first and second ends;
(c) positioning the pivoting lens unit in said housing; and
(d) securing the pivot cartridge within the housing.

27. A method of manufacturing a riflescope, comprising the steps of:
(a) pre-assembling a pivoting lens unit for insertion into a tubular housing of the riflescope having a longitudinal axis by the steps of:

(i) pivotally seating a lens-holding pivot tube in a pivot cartridge so that the pivot tube is pivotable transversely to the longitudinal axis of the housing when the pivoting lens unit is installed in the housing, and (ii) after pivotally seating the pivot tube in the pivot cartridge, attaching a fastener to the pivot cartridge to retain the pivot tube to the pivot cartridge;

(b) positioning the pre-assembled pivoting lens unit in the housing; and (c) securing the pre-assembled pivoting lens unit in the housing.

\* \* \* \* \*

UNITED STATES PATENT AND TRADEMARK OFFICE
CERTIFICATE OF CORRECTION

PATENT NO. : 6,816,305 B2  
APPLICATION NO. : 10/282740  
DATED : November 3, 2004  
INVENTOR(S) : Regan et al.

Page 1 of 1

It is certified that error appears in the above-identified patent and that said Letters Patent is hereby corrected as shown below:

Column 2  
Line 33 delete "capable".

Column 7  
Line 22 delete "ion".

Signed and Sealed this

Twenty-first Day of October, 2008

JON W. DUDAS  
*Director of the United States Patent and Trademark Office*

UNITED STATES PATENT AND TRADEMARK OFFICE
CERTIFICATE OF CORRECTION

PATENT NO. : 6,816,305 B2  
APPLICATION NO. : 10/282740  
DATED : November 9, 2004  
INVENTOR(S) : Regan et al.

Page 1 of 1

It is certified that error appears in the above-identified patent and that said Letters Patent is hereby corrected as shown below:

Column 2  
Line 33 delete "capable".

Column 7  
Line 22 delete "ion".

This certificate supersedes the Certificate of Correction issued October 21, 2008.

Signed and Sealed this

Eleventh Day of November, 2008

JON W. DUDAS  
*Director of the United States Patent and Trademark Office*